Patented Nov. 6, 1951

2,573,964

UNITED STATES PATENT OFFICE 2,573,964

FILTER

Henry Lionel Green, Salisbury, Daniel James Thomas, Tony, near Salisbury, and Walter John Harris, Salisbury, England, assignors to Minister of Supply, in His Majesty's Government of the United Kingdom of Great Britain and Northern Ireland, London, England No Drawing. Application February 25, 1948, Serial No. 10,924. In Great Britain April 20, 1945

Section 1, Public Law 690, August 8, 1946
Patent expires April 20, 1965

9 Claims. (Cl. 183—7)

This invention relates to filters for air and other gases or vapour and although particularly designed for use in respirators and like breathing appliances it may be capable of general application when the conditions for its use are suitable.

The object of the present invention is to devise an improved material for removing finely divided suspended particles from air or other gases which will give a high degree of filter efficiency combined with low resistance to the passage of gases therethrough.

With the foregoing object in view the invention provides a filter comprising felted fibres coated with electrified particles of materials of resinous nature which are adapted to retain their electrical charge for very long periods.

The filter may be prepared by incorporating the resinous material with proteinaceous fibres such as wool or other animal fibrous materials, which may or may not be already felted, electrifying by mechanical means and felting where necessary.

The resinous materials suitable for the purpose of the invention comprise natural resins and modified resins or synthetic resins.

In order that the resinous material may retain its electrical charge for long periods even under extremes of temperature and humidity, it should have a high specific volume resistivity and high specific surface resistivity under extreme temperatures and humidities. For example, if the specific volume resistivity is greater than $10^{17}$ ohm-cm., and the specific surface resistivity is greater than $10^{16}$ ohms, the charge should be retained for a number of years.

We have also found that it is advantageous to use resins which are so brittle that they disrupt readily under mechanical stress and are more readily electrified by this means.

The terms "specific volume resistivity" and "surface resistivity" of a substance as herein employed may be defined as follows:

Specific volume resistivity is the resistance of a body of the substance one cm. square cross section and one cm. in length.

Surface resistivity is the resistance of one cm. length of strip of the surface of one cm. width.

The term "felt" or "felted fibers," as herein employed is used in the generally accepted sense in which a felt is a coherent material which contains at least a proportion of animal fibers sufficient to cause interlocking when the fibrous mass is subjected to the action of a felting machine. Non-animal fibers, such as cotton fibers, may also be incorporated in the felt to a small extent.

An example of a suitable resin which meets the foregoing requirements is resin-modified tertiary butyl phenol-formaldehyde resin known as Beckacite 1643. Natural resins, such as fused medium Congo copal resin, or resin modified by the addition of metallic oxides may also be used. Such resinous materials have high melting points and are suitable for filter impregnation according to the invention.

The felted filter material of the invention preferably contains from 10% to 40% by weight of resinous material.

It will be apparent from the foregoing that the fibrous material may be felted either before or after impregnation with resinous material; thus powdered resin may be mixed with woollen fibres and the mixture may then be carded for example on a carding machine to charge the particles electrically whereupon the mixture is felted by known methods. Alternatively a pre-formed felt is soaked in a solution of a resin and is then dried, whereupon the impregnated felt is treated mechanically to disrupt the resin and charge the particles thereof electrically.

The invention will now be illustrated with reference to the following examples:

Example 1

In one convenient method of carrying the invention into practical effect Beckacite 1643 in powdered form is thoroughly mixed in a proportion of from 10% to 40% by weight with from 90% to 60% by weight of merino wool noils and the mixture is carded on a cotton or wool carding machine, taking care that the machine is loaded with resin before the wool-resin mixture is introduced, as otherwise a considerable proportion of the resin would be removed from the mixture by the cards.

The carding of the mixture forms an important step in the process and is believed to disrupt the grains of resin and to cause them to become for practical purposes, permanently electrified, while in addition, the heat generated in carding appears to cause localised melting of the resin particles, with the result that they adhere to and uniformly coat the wool fibres.

The carded lap of wool fibres coated with electrified resin particles is passed repeatedly through a roll hardening machine until a felt of the required hardness is obtained. The felt is then dried and the resin recharged by rolling several times between sheet bending rollers.

In carrying the process into practical effect it is necessary to take precautions to prevent loss of resin during felting, the felting itself causes the resin particles to lose electrical charge, but the resin impregnated felt is recharged electrically by the foresaid process of repeated rolling between sheet bending rollers.

*Example 2*

Medium fused Congo copal resin in powdered form is thoroughly mixed in a proportion of from 10% to 40% with from 90% to 60% by weight of merino wool noils and the mixture is carded on a cotton or wool carding machine and then the carded lap is subjected to felting and recharging as set forth in the preceding example.

*Example 3*

In a like manner a felt impregnated with lime-hardened resin can be prepared by carding a mixture of from 10% to 40% of powdered lime hardened resin and from 90% to 60% of merino wool noils, felting the carded lap by a roll hardening process and recharging the resin by repeatedly rolling the felt between sheet bending rollers.

*Example 4*

Another method of carrying out the invention is to take a wool felt or a felt of wool mixed with a proportion of cotton fibres and thoroughly soak it in a 20% solution of Beckacite 1643 in carbon tetrachloride. After impregnating the felt, the excess solution is removed by hydroextraction and the felt is then thoroughly dried. The speed and duration of hydroextraction is adjusted so that the dried felt contains between 10% and 40% by weight of resin. The resin in the felt is then electrically charged by the method described in the previous examples.

*Example 5*

In yet another method of carrying out the invention, a felt of wool or of wool mixed with a proportion of cotton fibres is thoroughly soaked in a dispersion of polystyrene emulsion polymer. The felt is hydroextracted to remove the excess dispersion and then dried. The process is adjusted so that the dried felt contains from 10% to 40% of polymer. The polymer particles in the dried felt are charged as previously described.

*Example 6*

In one further method of performing the invention, the impregnated felt, prepared by any of the previous methods, before charging by rolling between sheet bending rollers, is carefully heated above the melting point of the resin so that the fibres are coated with a layer of fused resin. The felt is then charged by rolling as described.

The filtering efficiency of the felt filters of the present invention is affected only to a small degree by continued use against smokes, by the passage of corrosive gases through them, and by extremes of temperature and humidity.

Whereas filters made in accordance with the disclosure of British Patent No. 573,951 usually requires to be supported in a compressed state in a container when being used for the purpose for which it is designed, the filter of the present invention owing to its felted structure need only be supported at its periphery during use and, moreover, it possesses a further advantage for certain purposes in that it can readily be folded or pleated so that a large area of filtering material can be brought within a small compass.

It will be understood that the invention is not limited to the precise materials hereinbefore given by way of example, as we may employ other fibrous material in place of merino wool and any resin of suitable physical properties, whether natural or synthetic.

We claim:

1. A process for making a self-supporting gas filter which comprises subjecting to repeated rolling between sheet-bending rollers a felted material containing animal fibers and a resin having a specific volume resistivity greater than $10^{17}$ ohm-cm. and a surface resistivity greater than $10^{16}$ ohms.

2. A process for making a self-supporting gas filter material which comprises subjecting to repeated rolling between sheet bending rollers a felt comprising animal fibers impregnated with from 10 to 40% by weight of a resin having a specific volume resistivity greater than $10^{17}$ ohm-cm. and a surface resistivity greater than $10^{16}$ ohms.

3. A process for making a self-supporting gas filter material from fibrous material containing animal fibers and a resin having a specific volume resistivity greater than $10^{17}$ ohm-cm. and a surface resistivity greater than $10^{16}$ ohms which comprises the steps of felting said fibrous material, impregnating the felt with said resin in a liquid medium, drying the impregnated felt, and subsequently subjecting the resulting felt to sufficient rolling between sheet bending rollers to electrify the particles of said resin.

4. A process for making a self-supporting gas filter material from fibrous material containing animal fibers and a resin having a specific volume resistivity greater than $10^{17}$ ohm-cm. and a surface resistivity greater than $10^{16}$ ohms which comprises the steps of felting said fibrous material, impregnating the felt with said resin in a liquid medium whereby to deposit an amount of said substance in the felt which is from 10 to 40% of the weight thereof, drying the impregnated felt, and subsequently subjecting the resulting felt to sufficient rolling between sheet bending rollers to electrify the particles of said resin.

5. A process for making a self-supporting gas filter material from fibrous material containing animal fibers and a resin having a specific volume resistivity greater than $10^{17}$ ohm-cm. and a surface resistivity greater than $10^{16}$ ohms which comprises the steps of mixing said fibrous material with said resin in powdered form, subjecting said mixture to a carding operation to electrify the particles of said resin and cause them to adhere to the fibers, felting said mixture, and subsequently subjecing the impregnated felt to sufficient rolling between sheet bending rollers to re-electrify the particles of said resin.

6. A process for making a self-supporting gas filter material which comprises subjecting to repeated rolling between sheet bending rollers an impregnated felt containing animal fibers and a resin having a specific volume resistivity greater than $10^{17}$ ohm-cm. and a surface resistivity greater than $10^{16}$ ohms selected from the group consisting of fused Congo copal resin, rosin-modified tertiary butyl phenolformaldehyde resin and polystyrene.

7. A process for making a self-supporting gas filter material from fibrous material containing animal fibers and rosin-modified tertiary butyl phenolformaldehyde resin which comprises the steps of mixing said fibrous material with said resin in powdered form, subjecting said mixture to a carding operation to electrify the particles of said mixture, and subsequently subjecting the impregnated felt to sufficient rolling between sheet bending rollers to re-electrify the particles of said resin.

8. A gas filter unit having a filter member of felt combined with an electrified resin material, said filter member comprising electrified particles of a finely divided resin uniformly distributed throughout the felt, said resin having a specific volume resistivity greater than $10^{17}$ ohms-cm. and a surface resistivity greater than $10^{16}$ ohms, and said felt filter member being sufficiently rigid to be self-supporting, as prepared by the process of claim 2.

9. A gas filter unit having a filter member of felt combined with an electrified resin material, said filter member comprising electrified particles of a finely divided resin uniformly distributed throughout the felt, said resin being one selected from the group consisting of Congo copal resin, rosin-modified tertiary butyl phenolformaldehyde resin and polystyrene, and said felt filter member being sufficiently rigid to be self-supporting, as prepared by the process of claim 6.

HENRY LIONEL GREEN.
DANIEL JAMES THOMAS.
WALTER JOHN HARRIS.

REFERENCES CITED

The following references are of record in the file of this patent:

UNITED STATES PATENTS

| Number | Name | Date |
|---|---|---|
| 1,947,024 | Slagle | Feb. 13, 1934 |
| 2,212,162 | Littleton | Aug. 20, 1940 |
| 2,347,031 | Cupery | Apr. 18, 1944 |
| 2,372,437 | Lathrop et al. | Mar. 27, 1945 |

FOREIGN PATENTS

| Number | Country | Date |
|---|---|---|
| 292,479 | Great Britain | June 13, 1929 |
| 395,918 | Great Britain | July 27, 1935 |
| 434,700 | Great Britain | Sept. 6, 1935 |
| 435,168 | Great Britain | Sept. 16, 1935 |
| 448,664 | Great Britain | June 12, 1936 |
| 518,087 | Germany | Feb. 9, 1931 |